(12) United States Patent
Shikata et al.

(10) Patent No.: US 6,308,770 B1
(45) Date of Patent: Oct. 30, 2001

(54) AIR CONDITIONING APPARATUS

(75) Inventors: Kazushi Shikata; Yukio Uemura, both of Kariya; Hiroshi Nonoyama, Toyota; Kenji Suwa, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 08/728,699

(22) Filed: Oct. 11, 1996

(30) Foreign Application Priority Data

Oct. 12, 1995 (JP) .................................................... 7-264126

(51) Int. Cl.⁷ .............................. F25B 29/00; B60H 1/00; B60H 3/00

(52) U.S. Cl. ............................ 165/42; 165/43; 165/153; 165/126; 165/203; 237/12.3 B; 237/12.3 A; 454/156

(58) Field of Search ................ 165/42, 43, 126, 165/153, 203; 454/156; 237/12.3 A, 12.3 B (56) References Cited

U.S. PATENT DOCUMENTS

| 1,903,653 | * | 4/1933 | Brock ............................... 237/12.3 B |
| 3,250,325 | * | 5/1966 | Rhodes et al. ........................ 165/153 |
| 4,332,293 | * | 6/1982 | Hiramatsu ............................ 165/153 |
| 4,460,036 | * | 7/1984 | Yoshimi et al. ........................ 165/42 |
| 4,559,994 | * | 12/1985 | Waldmann et al. ............ 237/12.3 B |
| 4,615,384 | | 10/1986 | Shimada et al. . |
| 4,940,083 | | 7/1990 | Takenaka et al. . |
| 4,976,309 | * | 12/1990 | Averin ................................... 165/42 |
| 5,016,704 | | 5/1991 | Ono . |
| 5,219,017 | * | 6/1993 | Halstead et al. ................ 237/12.3 B |
| 5,390,728 | * | 2/1995 | Ban ......................................... 165/42 |

FOREIGN PATENT DOCUMENTS

| 662244 | * | 12/1951 | (GB) ..................................... 165/126 |
| 0051615 | * | 4/1980 | (JP) ....................................... 165/43 |
| 0122213 | * | 7/1983 | (JP) ....................................... 165/43 |
| A608105 | | 1/1985 | (JP) . |

OTHER PUBLICATIONS

Patent Abstracts of Japan, vol. 009, No. 121 (M–382), May 25, 1985 & JP 60 008105 A (Nippon Denso KK), Jan. 17, 1985.

* cited by examiner

Primary Examiner—John K. Ford
(74) Attorney, Agent, or Firm—Harness, Dickey & Pierce, PLC (57) ABSTRACT

According to the present invention, an air conditioning apparatus include a case partitioned into a first air passage and a second air passage by partition plates (16–19), a heat exchanger such as a heater core. The heater exchanger is sandwiched between the partition plates. Further, the heat exchanger is formed by laminating tubes and a fin while the fin is disposed in each main air passage formed between tube walls of the tubes. Each end of the partition plates is opposite to each end of the tubes so that the partition plates are parallel to the tubes. In this way, airflows which respectively have passed from the air first and second passages pass through the heat exchanger without being mixed with each other therein. As a result, the separation characteristics of airflows can be improved.

24 Claims, 6 Drawing Sheets

AIR CONDITIONING APPARATUS

CROSS REFERENCE TO RELATED APPLICATION

This application is based upon and claims the benefit of priority of the prior Japanese Patent Applications No. Hei. 7-264126 filed on Oct. 12, 1995.

BACKGROUND OF THE INVENTION

1. Field of the Invention

The present invention generally relates to an air conditioning apparatus for a vehicle, in which conditioned air having different states from each other pass through respective air passages partitioned by a partition plate and are simultaneously blown out from plural air outlets into a passenger compartment. Particularly, the present invention relates to an arrangement of the partition plate for partitioning the air passages.

2. Related Arts

Conventionally, an air conditioning apparatus in which air flows having different states such as temperature or humidity from each other are respectively blown out from plural air outlets has been known as disclosed in JP-A-60-8105. In this air conditioning apparatus, it is possible to prevent the heating efficiency from deteriorating as well as the windshield from being clouded in a heating operation.

In the air conditioning apparatus disclosed in JP-A-60-8105, an interior of a case is divided into an outside air passage and an inside air passage by partition plates, and an evaporator, a heater core portion which is a half of the heater core and divided by a partition plate, and a fan are disposed in each of the air passages. Accordingly, the inside air and the outside air can pass through the evaporator and the heater core without being mixed with each other. Therefore, the inside air after being conditioned can be blown out into the passenger compartment from a foot air outlet, and the outside air after being conditioned, humidity of which is low, can be blown out from a defroster air outlet.

However, according to examinations by the inventors, turns out that separation characteristics for separating air flows passing into the respective air passages is deteriorated, depending on the arrangement of the partition plates.

SUMMARY OF THE INVENTION

The present invention has been accomplished on the basis of the following findings.

Figure 9:
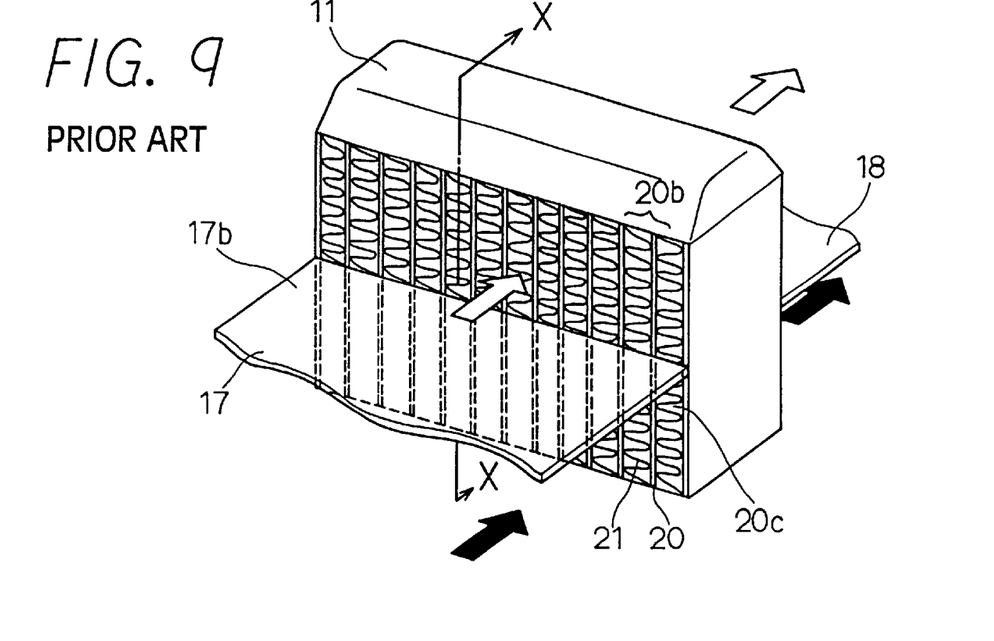
FIG. 9 is a perspective view showing an arrangement of an evaporator and partition plates of a comparative example.

As shown in FIG. 9, a laminated type evaporator 11 is composed of plural tubes 20 and fins 21. Each main passage 20b is formed between each pair of the adjacent tube wall surfaces 20a of flat tubes 20, and a fin 21 (a corrugated fin) is folded and disposed in each main passage 20b. The main passage 20b is partitioned into plural secondary air passages 20c by a plate, and the adjacent secondary air passages 20c are communicated with each other through plural louvers 22 which are formed by cutting the plate so as to stand from the plate surface.

Figure 10:
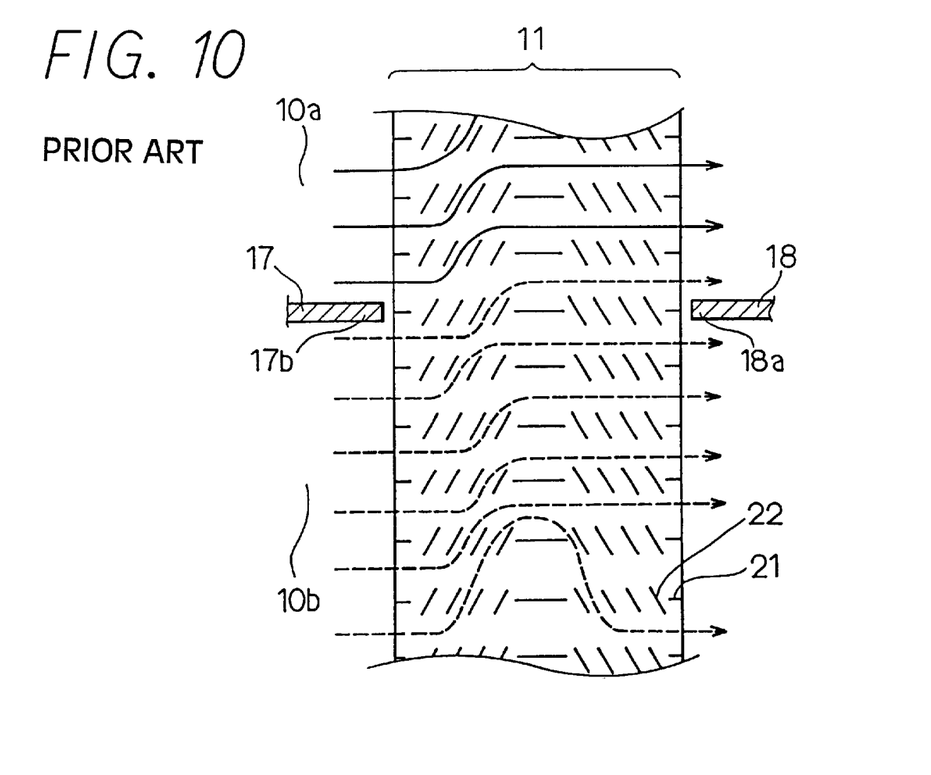
FIG. 10 is a cross sectional view taken along the line X—X of FIG. 9, showing the arrangement of the evaporator and the partition plates.

In an air conditioning apparatus having the above mentioned evaporator 11, airflows such as inside air and outside airflows having different states from each other flow into the evaporator 11 through a first and a second air passage divided by partition plates 17 and 18 without being mixed with each other. However, when the partition plates 17 and 18 are disposed generally perpendicular to the tubes 20 so as to form the first and second air passages 10a and 10b as shown in FIG. airflows which have passed through the evaporator 11 10, separately may be mixed together in the evaporator 11, because the adjacent secondary air passages communicated with each other through the louvers 22. Consequently, there is a problem that the separation characteristics for separating airflows may be deteriorated.

The present invention has been accomplished in view of the above mentioned problems, and it is an object of the present invention to provide an air conditioning apparatus for a vehicle, in which conditioned air having different states from each other pass through respective air passages divided by a partition plate and are simultaneously blown out from plural air outlets into a passenger compartment, capable of improving separation characteristics of airflows into the respective air passages.

According to the present invention, an air conditioning apparatus includes a case having an air passage therein, a heat exchanger, and a partition plate for partitioning the air passage into a first and a second air passage. The heat exchanger includes tubes and a fin, in which a main air passage is formed between each of adjacent tubes. A corrugated fin is disposed in each main air passage. Airflows respectively passing through the first air passage and the second air passage and having different phases such as temperature or humidity from each other pass in each main air passage without being mixed with each other. In the air conditioning apparatus, the partition plate is disposed generally parallel to the tube, and a length of said fin in an airflow direction being generally equal to that of said tube in said airflow direction. Accordingly, airflows which have passed through the first and the second air passages respectively flow into the heat exchanger and are not mixed each other in the heat exchanger, thereby improving the separation characteristics of airflows.

An end of the partition plates may be disposed so as to be opposite to an end of the tube.

Further, the partition plate may include two plates, in which one is disposed at an upstream air side of the heat exchanger and another is disposed at a downstream air side of the heat exchanger.

A thickness of a heat exchanger side end of the partition plate disposed at the upstream air side of the heat exchanger may be thicker than that of the other portion of the partition plate. As a result, the separation characteristics of the air currents are more improved.

A distance between the end of the partition plate and an end of the tube of the heat exchanger may be smaller than 10 mm. Accordingly, it is efficiently prevented that airflows which have passed through the fist and second air passages are mixed with each other at an opening between the partition plate and the tube.

Further, the case may be formed with an inside air inlet and an outside air inlet at the upstream air side of the heat exchanger, and the air passage is partitioned by the partition plate into an inside air passage through which the inside air sucked from the inside air inlet passes and an outside air passage through which the outside air sucked from the outside air inlet passes. Therefore, the inside air current and the outside airflows having different temperatures or humidities from each other respectively pass through the heat exchanger and flow into the air passages at the downstream air side of the heat exchanger without being mixed with each other.

The heat exchanger may be a heater core disposed at a downstream air side of an evaporator, for heating air cooled by the evaporator. Further, a door may be disposed between the evaporator and the heater core to adjust each amount of air flowing into the heater core to be heated in the heater core and air flowing so as to bypass the heater core. In this way, each temperature of airflows passing through the first and the second air passages can be independently adjusted.

BRIEF DESCRIPTION OF THE DRAWINGS

The present invention will become more fully understood from the detailed description given hereinbelow and the accompanying drawings which are given by way of illustration only and are not intended to limit the present invention, and wherein.

DETAILED DESCRIPTION OF THE PRESENTLY PREFERRED EXEMPLARY EMBODIMENTS

Embodiments according to the present invention will be described hereinafter with reference to the drawings.

A first embodiment of the present invention will be described.

Figure 3:
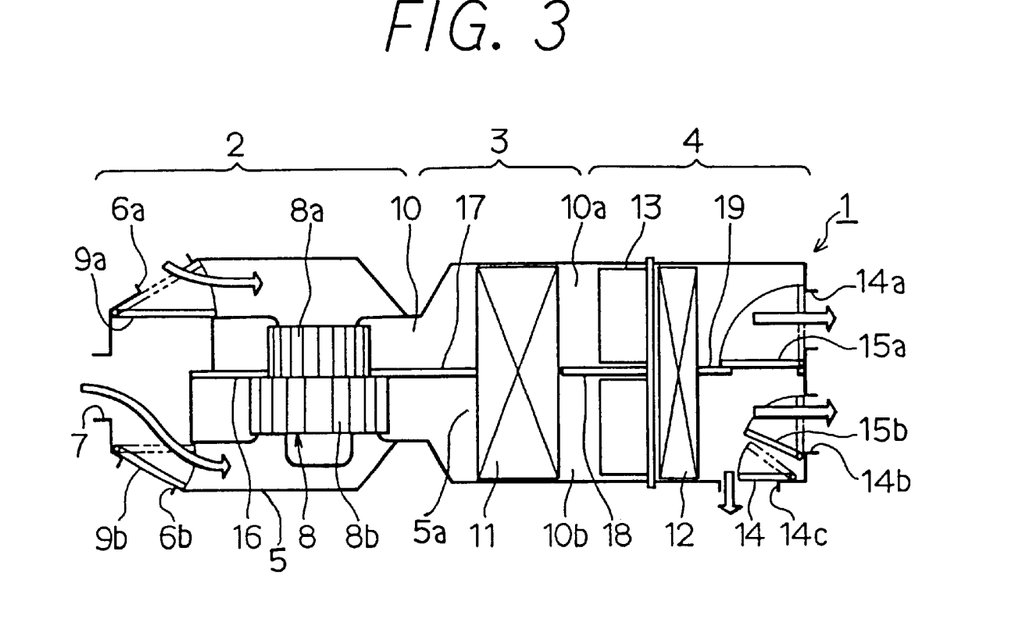
FIG. 3 is a diagram showing an air conditioning apparatus of the first embodiment.

FIG. 3 schematically shows an air conditioning apparatus 1 for a vehicle. The air conditioning apparatus 1 is composed of, in the order from an upstream air side, a blower part 2, a cooler part 3 and a heater part 4. Air conditioning functional components are disposed within a case 5 made of resin such as polypropylene or the like. Further, an air passage 5a is formed in the case 5.

The blower part 2 includes inside air inlets 6a and 6b and an outside air inlet 7 disposed at the most upstream air side in the case 5, and an up and down suction fan 8 accommodated in a scroll casing at a downstream air side of the air inlets 6a, 6b and 7.

At the downstream air side of the inside air inlets 6a and 6b, an inside/outside air switching doors 9a and 9b are respectively disposed. By rotating the inside/outside air switching doors 9a and 9b, a first air passage 10a or a second air passage 10b (described later) is switched to either one of the air passage through which the inside passes and the air passage through which the outside air passes, respectively.

The cooler part 3 includes an evaporator 11 for cooling air sucked by the blower part 2. The heater part 4 includes a heater core 12 for heating air which passed through the evaporator 11. Further, air mix doors 13 are rotatably disposed at the upstream air side of the heater core 12. By adjusting an opening degree of the air mix door 13, an amount of air passing through the heater core 12 is adjusted, and the air conditioning is performed.

At the most downstream air side in the case 5, a foot air outlet 14a for blowing out conditioned air toward feet of a driver in a passenger compartment, a defroster air outlet 14b for blowing out air toward a windshield glass, and a face air outlet 14c for blowing out conditioned air toward a breast of the driver are disposed. At the air outlets 14a, 14b and 14c, a foot door 15a, a defroster door 15b and a face door 15c are provided, respectively.

The up and down suction fan 8, the evaporator 11 and the heater core 12 are generally arranged in a line with reference to an airflow direction, and plural partition plates 16, 17, 18 and 19 are generally disposed on the center line of this arrangement. The partition plates 16 to 19 are fixed to the case 5 by positioning pins (not shown) penetrating through the partition plates 16, 17, 18 and 19 in a direction generally perpendicular to the airflow direction. The air passage 5a in the case 5 is divided by the partition plates 16 to 19 into a first air passage 10a communicating with the foot air outlet 14a, a second air passage 10b communicating with the defroster air outlet 14b and the face air outlet 14c.

The partition plate 16 is disposed at an upstream air side of the up and down suction fan 8, and the partition plate 17 is disposed at a downstream air side of the up and down suction fan 8. The up and down suction fan 8 includes fans 8a and 8b having different diameters from each other, while the fan 8a is disposed at an upper side and the fan 8b is disposed at a lower side in FIG. 3. The fans 8a and 8b are partitioned by the partition plates 16 and 17, and air which are sucked by the fans 8a and 8b are separately blown out.

Further, since a downstream air side end 17b of the partition plate 17 extends to the evaporator 11, air which are sucked by the fans 8a and 8b separately flow into the evaporator 11.

The partition plate 18 disposed at the downstream air side of the evaporator 11 extends from the evaporator 11 to the heater core 12, and air which passed through the evaporator 11 separately flow into the heater core 12 while keeping the separated states. The air mix doors 13 are partitioned by the partition plate 18.

Further, the partition plate 19 disposed at the downstream air side of the heater core 12 extends from the heater core 12 to the foot door 15 so that an end of the partition plate 19 contacts with the foot door 15 when the foot air outlet 14a is opened.

As described above, the partition plates 17, 18 and 19 are disposed to partition the air passage 5a into the first and the second air passages 10a and 10b, and the evaporator 11 and the heater core 12 are sandwiched between the partition plates 17 and 18, and 18 and 19, respectively. Next, arrangements of the partition plates 17, 18 and 19 with reference to the evaporator 11 and the heater core 12 will be described.

Figure 1:
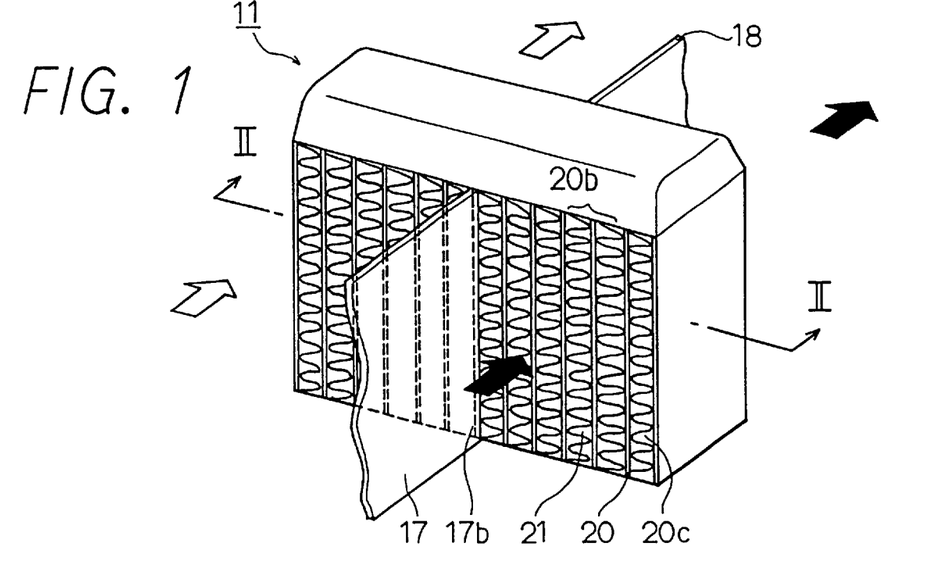
FIG. 1 is a perspective view showing an evaporator and an arrangement of an evaporator and partition plates of a first embodiment according to the present invention.
Figure 2:
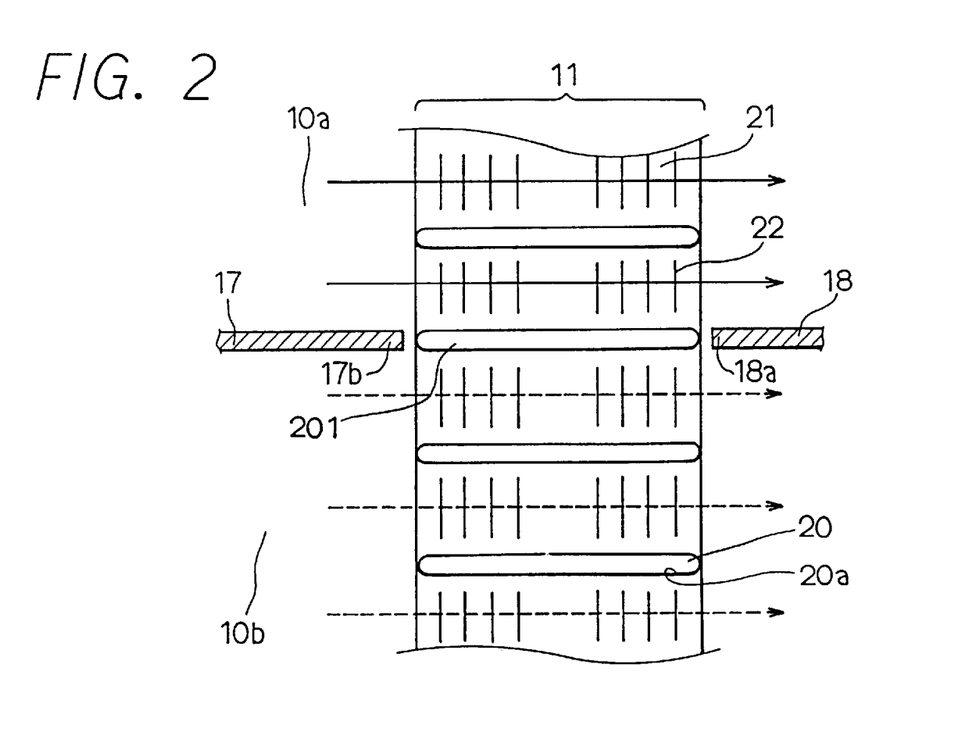
FIG. 2 is a cross sectional view taken along the line II—II of FIG. 1, showing the arrangement of the evaporator and the partition plates of the first embodiment.

As shown in FIGS. 1 and 2, the evaporator 11 is a laminated type heat exchanger including tubes 20 in which refrigerant flows, and corrugated fins (hereinafter called fins) 21 for improving the heat exchanging performance.

Each of the tubes 20 is a flat tube having an elliptic cross section. Plural tubes 20 are laminated together in such a manner that flat tube walls 20a thereof become generally parallel to the airflow direction. Accordingly, the evaporator 11 includes plural spaces divided by the tubes 20, and each divided space between the adjacent tube walls 20a functions as a main air passage 20b.

Each of the folded fins 21 is disposed in each main air passage 20b and is connected to the tube walls 20a by brazing. Therefore, the main air passages 20b are further divided into plural spaces. Air passes through the divided spaces between the adjacent plate surfaces of the folded fins 21, that is, the divided spaces forms secondary air passages 20c. The fins 21 are formed with plural louvers 22 by cutting the plate surfaces so as to stand the louvers 22 to improve the heat exchanging efficiency, so that the adjacent secondary air passages 20c are communicated with each other through the louvers 22. In this case, the length of the fin 21 in the airflow direction is generally equal to that of the tubes 20 in the airflow direction.

The partition plate 17 to be disposed at the upstream air side of the evaporator 11 is disposed in such a manner that an end 17b thereof is opposite to an upstream air side end of a tube 201 which is one of plural tubes 20 as shown in FIG. 2. That is, the partition plate 17 and the tube 201 are coplanar. Further, the partition plate 17 is disposed generally parallel to the tube walls 20a of the tubes 20, and the airflow direction at the upstream air side of the evaporator 11 corresponds to the airflow direction in the main air passages 20b in the evaporator 11.

On the other hand, the partition plate 18 to be disposed at the downstream air side of the evaporator 11 is disposed in such a manner that an end 18a thereof is opposite to a downstream air side end of the tube 201 as shown in FIG. 2. That is, the partition plate 18 and the tube 201 are coplanar, too. Further, the partition plate 18 is disposed generally parallel to the tube walls 201a of the tubes 201, and the airflow direction in the evaporator 11 corresponds to the airflow direction at the downstream air side of the evaporator 11.

Figure 4:
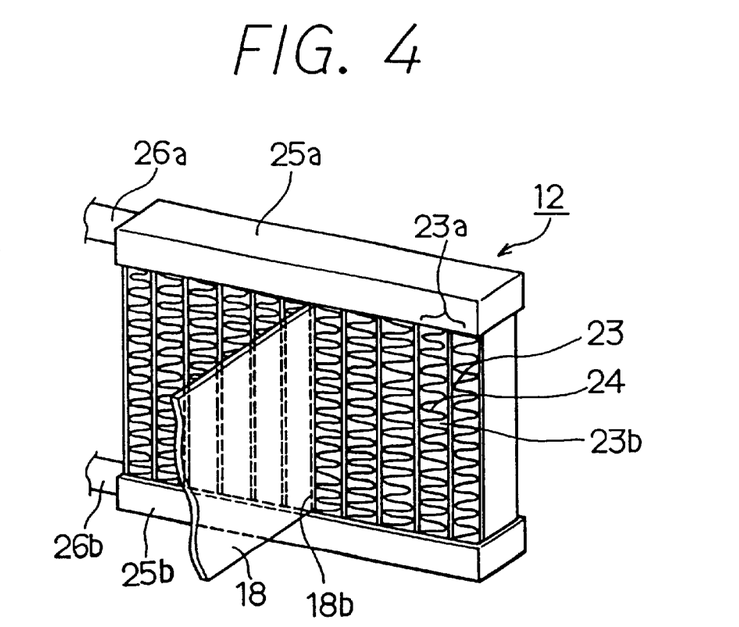
FIG. 4 is a perspective view showing a heater core and an arrangement of the heater core and partition plates of the first embodiment.

Next, a structure of the heater core 12 will be described.

As shown in FIG. 4, the heater core 12 is a laminated type heat exchanger composed of tubes 23 in which engine cooling water flows, corrugated fins (hereinafter called fins) 24 for improving the heat exchanging performance, an inlet tank 25a communicating with an inlet tube 26a, and an outlet tank 25b communicating with an outlet tube 26b.

Each of the tubes 23 is a flat tube having an elliptic cross section. Plural tubes 23 are laminated in such a manner that flat tube walls (not shown) are generally parallel to the airflow direction. Accordingly, the heater core 12 includes plural spaces divided by the tubes 23, and each divided space between the adjacent tube walls functions as a main air passage 23a.

Each of the folded fins 24 is disposed in each main air passage 23a and is connected to the tube walls by brazing. Therefore, the main air passages 23a are further divided into plural spaces by folded fins 24. Air passes through the divided spaces between the adjacent plate surfaces of the folded fins 24, that is, the divided spaces forms secondary air passages 23b. The fins 24 are formed with plural louvers (not shown) by cutting the plate surfaces so as to stand the louvers to improve the heat exchanging efficiency, so that the adjacent secondary air passages 23b are communicated with each other through the louvers.

The tubes 23 and the outlet tank 25b arranged as the above are communicated with the inlet tank 25a at the upper end and the lower end, respectively. The inlet tank 25a is connected to the inlet tube 26a, and the outlet tank 25b is connected to the outlet tube 26b.

The engine cooling water flows from an engine (not shown) to the inlet tank 25a through the inlet tube 26a, and then flows to the tubes 23. The cooling water further flows into the outlet tank 25b through the tubes 23, and then flows into the engine again through the outlet tube 26b.

The partition plates 18 and 19 are arranged with reference to the heater core 12 in the same manner as the partition plates 17 and 18 being arranged with reference to the evaporator 11. That is, a heater core side end 18b of the partition plate 18 is opposite to an upstream air side end of one of the tubes 23, while a heater core side end 19a of the partition plate 19 is opposite to a downstream air side end of the tube 23. In this case, the partition plates 18 and 19 are coplanar.

Next, an operation of the first embodiment will be described.

When the up and down suction fan 8 rotates, the inside air and the outside air are respectively sucked from the inside air inlets 6a and 6b and the outside air inlet 7, and then independently flow into the first and second air passages 10a and 10b in accordance with a blowing mode. The air having flowed from the air passages 10a and 10b are cooled while passing through the evaporator 11. Each amount of the cooled air flowing into the heater core 12 to be heated is changed by the respective air mix doors 13, so that the temperatures of air passing through the air passages 10a and 10b are adjusted.

By rotating the inside/outside switching doors 9a and 9b disposed at the inside air inlets 6a and 6b, and the doors 15a, 15b and 15c disposed at the air outlets 14a, 14b and 14c, the blowing mode and types of air (inside air and outside air in the embodiment) to be blown out from the air outlets 14a, 14b and 14c are switched.

However, as described before, as a result of the examinations by the inventors, there causes a problem that airflows respectively passing through air passages 10a and 10b may be mixed with each other, i.e., the separation characteristics may be deteriorated, depending on the arrangement of the partition plates 17, 18 and 19 with reference to the evaporator 11 or heater core 12.

Next, it will be described how the arrangement of the partition plates with reference to the heat exchangers has an influence on the separation characteristics of airflows respectively passing through air passages, on the basis of results of an experiment.

The inventors have experimented by using the same air conditioning apparatus as that shown in FIG. 3. When the air conditioning apparatus has two types of the arrangements of the partition plates, separation characteristics for separating the airflows were evaluated.

One of the arrangements is shown in FIG. 9 as a comparative example. The partition plates 17 and 18 are disposed generally perpendicular to the tube walls 20a of the evaporator 11. The partition plates 18 and 19 are also disposed generally perpendicular to the tube walls of the heater core 12 (not shown).

The other arrangement of the partition plates according to the present invention is shown in FIGS. 1 and 2. The partition plates 17 and 18 were disposed generally parallel to the tube walls 20a of the tubes 20 of the evaporator 11 as shown in FIGS. 1 and 2. Further, the partition plate 17 is opposite to the end of the tube wall 20a of the tube 201 and the end of the partition plate 18 was opposite to the other end of the tube wall 20a of the tube 201. Further, the partition plates 18 and 19 are also arranged generally parallel to the tube walls of the tubes 23 of the heater core 12 as shown in FIG. 4.

In both arrangements of the partition plates, when each distance δ between the ends of the partition plates 17, 18 and 19 and the ends of the tube walls of the evaporator 11 or the heater core 12 was 0 mm, 2 mm or 4 mm, the separation characteristics of the air currents passing through the air passages 10a and 10b were evaluated.

The separation characteristics of the airflows passing through the air passages 10a and 10b were evaluated on the basis of inside air ratio. Firstly, an air, having a temperature of −20° C. and a relative humidity of 100%, flowed to the first air passage 10a as the outside air, while another air, having a temperature of 25° C. and a relative humidity of 40%, flowed to the second air passage 10b as the inside air. Then, the humidity of the air at the downstream air side of the heater core 12 in the first air passage 10a was measured, and calculate a mixing ratio of the inside air to the outside air (inside air ratio) was calculated.

Figure 11:
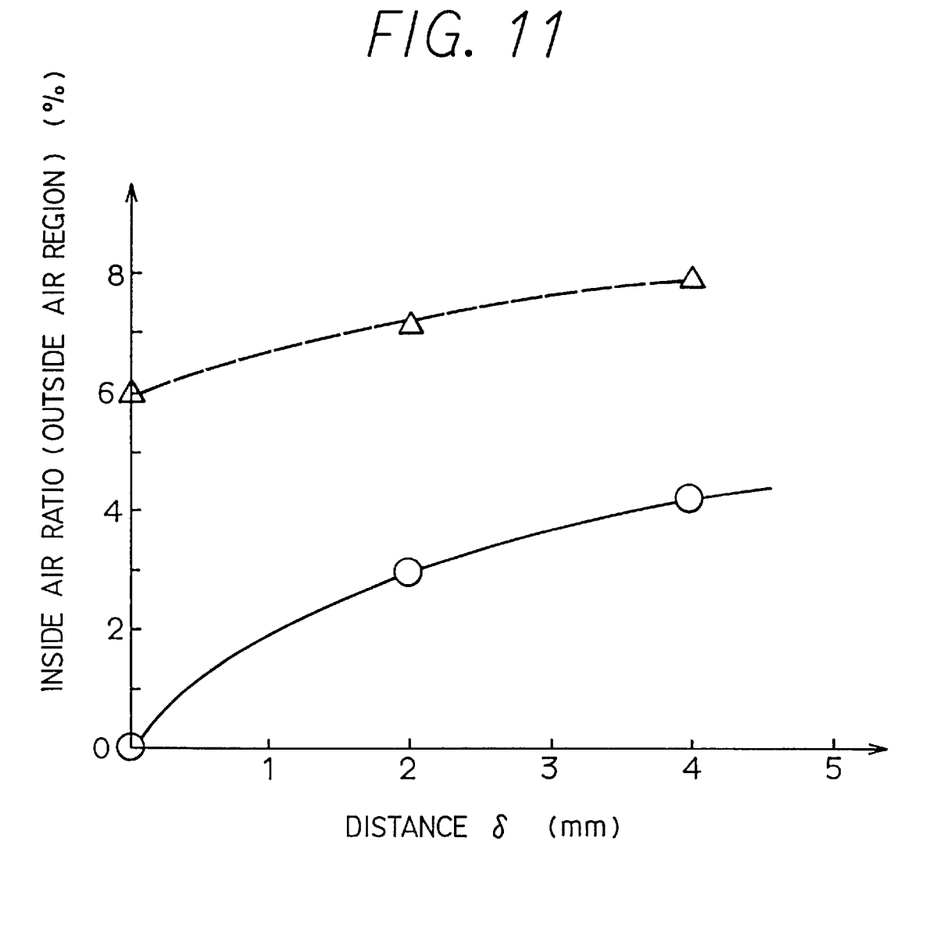
FIG. 11 is a graph showing characteristics between distances δ between an end of partition plate and an end of evaporator, and inside air ratio.

The results are shown in FIG. 11. In FIG. 11, a broken line (evaluated values are indicated by triangles) shows the characteristics between the distances δ and the inside air ratio under the arrangement of the comparative example, and a solid line (evaluated values are indicated by circles) shows the characteristics between the distances δ and the inside air ratios under the arrangement of the present invention.

As shown in FIG. 11, despite the distances δ between the ends of the partition plates 17, 18 and 19 and the ends of the tube walls, the inside air ratio under the arrangement of the present invention where the partition plates are disposed parallel to the tube walls are lower than that under the arrangement of the comparative example where the partition plates are disposed perpendicular to the tube walls. That is, it is apparent that the separation characteristics of the inside and the outside air under the arrangement of the present invention is superior to that of the comparative example.

As shown in FIGS. 1 and 2, the evaporator 11 includes plural main air passages 20b divided by the tubes 20. Therefore, airflows respectively passing through the main air passages 20b are separated by the tubes 20. On the other hand, each main air passage 20b is partitioned into the secondary air passages 20c by the plate surfaces of the folded fins 21, and the adjacent secondary air passages 20b are communicated with each other through the louvers 22 formed on the plate surfaces of the fins 21.

Therefore, under the arrangement of the comparative example where the partition plates 17 and 18 are arranged perpendicular to the tubes 20, the airflow which passed through the first air passage 10a (hereinafter called the first airflow) and the airflow which passed through the second air passage 10b (hereinafter called the second airflow) are mixed with together in the evaporator 11 because of the louvers 22. The first airflow is indicated by solid line arrows and the second airflow is indicated by broken line arrows in FIG. 10. As a result, the separation characteristics of the airflows are deteriorated.

On the other hand, under the arrangement of the present invention where the partition plates 17 and 18 are arranged parallel to the tubes 20, the first and the second airflows are not mixed in the evaporator 11 and respectively flowed to the air passages 10a and 10b at the downstream air side of the evaporator 11 as shown in FIG. 2.

Accordingly, the separation characteristics of the airflows can be improved. Further, since the partition plates 18 and 19 are arranged with reference to the heater core 12 in the same manner as the partition plate 17 and 18 being arranged to the evaporator 11, the separation characteristics of the airflows in the heater core 12 can be also improved.

The evaporator 11 is formed with the plural tubes 20 and fins 21 by laminating together. Therefore, it often happens that some of the parts may deviate from a predetermined size or may not be laminated accurately. However, in the embodiment, the ends of the partition plates 17 and 18 are disposed to be opposite to and close to the ends of the tube 201. Therefore, it can be prevented efficiently that the first and the second air airflows from are mixed with each other in the clearances between the ends of the tube 201 and the ends of the partition plates 17 and 18.

Since the arrangements of the partition plates 18 and 19 with reference to the heater core 12 are the same as those to the evaporator 11, the same effects as described above can be also obtained in the heater core 12.

Next, a second embodiment of the present invention will be described.

Although each partition plate in the first embodiment has a plane-like shape, a partition plate may be structured such that a thickness of the partition plate disposed at an upstream air side of a heat exchanger gradually increases toward the heat exchanger side.

Figure 5:
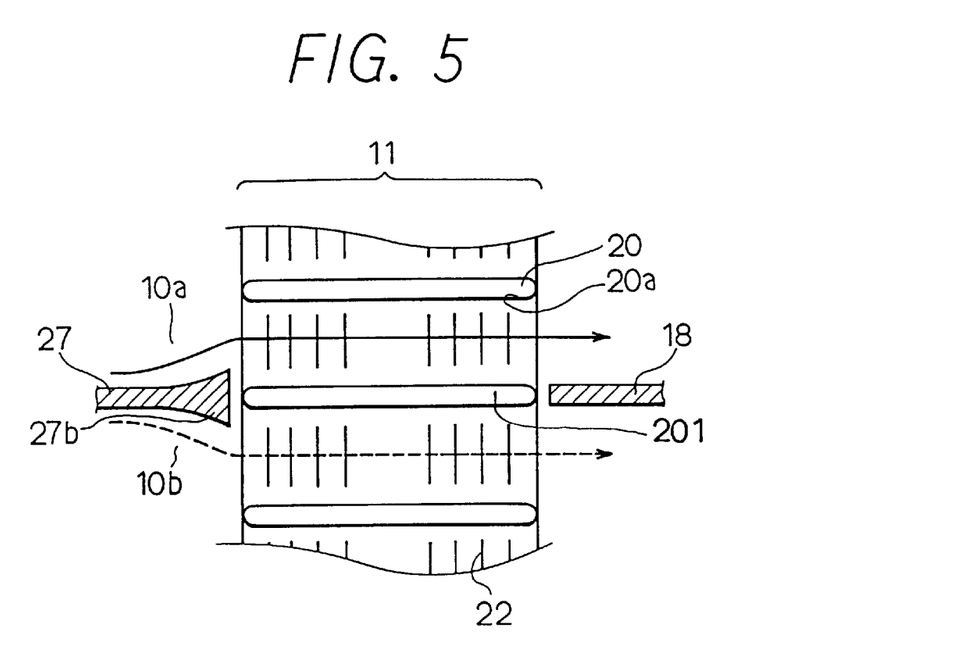
FIG. 5 is a sectional view showing an arrangement of an evaporator and partition plates of a second embodiment according to the present invention.

In the second embodiment, as shown in FIG. 5, a partition plate 27 disposed at an upstream air side of an evaporator 11 has an end 27b on the evaporator side, a cross section of which in parallel with the airflow direction spreads out. That is, the thickness of the partition plate 27 increases toward the end 27b at the evaporator side.

Accordingly, airflows passing through a first air passage 10a and a second air passage 10b flow while being more apart from each other toward the evaporator 11, and then flow into the evaporator 11. As a result, the separation characteristics for separating the air flowing into the first and second air passages 10a and 10b can be improved.

An arrangement of a partition plates 27 and 18 with reference to the evaporator 11 is the same as that in the first embodiment, and therefore the explanation is omitted.

Next, a third embodiment of the present invention will be described.

Figure 6:
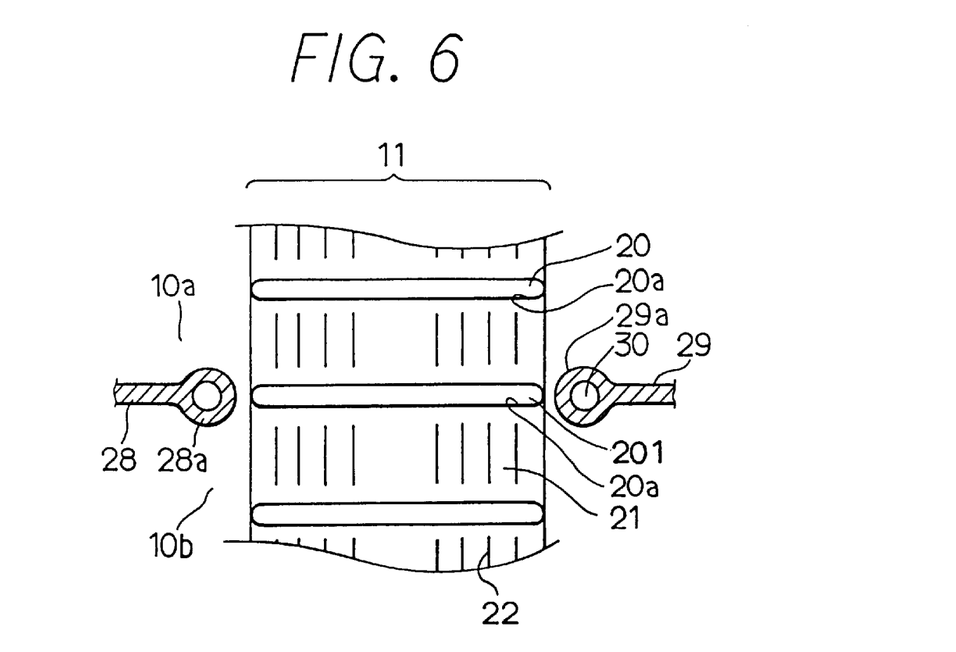
FIG. 6 is a sectional view showing an arrangement of an evaporator and partition plates of a third embodiment according to the present invention.

In the third embodiment, partition plates 28 disposed at an upstream air side of an evaporator 11 and partition plates 29 disposed at a downstream air side of an evaporator 11 are respectively supported in a case 5 by positioning pins 30 at each side of the heat exchanger as shown in FIG. 6.

The partition plate 28 disposed at an upstream air side of the evaporator 11 is formed with a through hole through which the positioning pin 30 passes at an end 28a on an evaporator side, in a direction generally perpendicular to an airflow direction. On the other hand, the partition plate 29 disposed at the downstream air side of the evaporator 11 is also formed with a through hole through which the positioning pin 30 passes at an end 29a on an evaporator side in a direction generally perpendicular to the airflow direction.

In this case, each thickness of the ends 28a and 29a of the partition plates 28 and 29 is somewhat thicker than that of the other portions of the partition plates 28 and 29. Therefore, airflows passing through air passages 10a and 10b flow while being more apart from each other toward the evaporator 11, and then flow into the evaporator 11 in separated states in the same way as in the second embodiment.

Next, a fourth embodiment of the present invention will be described.

In the first embodiment, the present invention is applied to the air conditioning apparatus in which the inside air and the outside air can be blown out from the different air outlets as shown in FIG. 3. However, the present invention may be applied to another air conditioning apparatus in which conditioned airflows having different temperatures from each other, from air outlets on a driver's seat side and on a passenger seat side.

Figure 7:
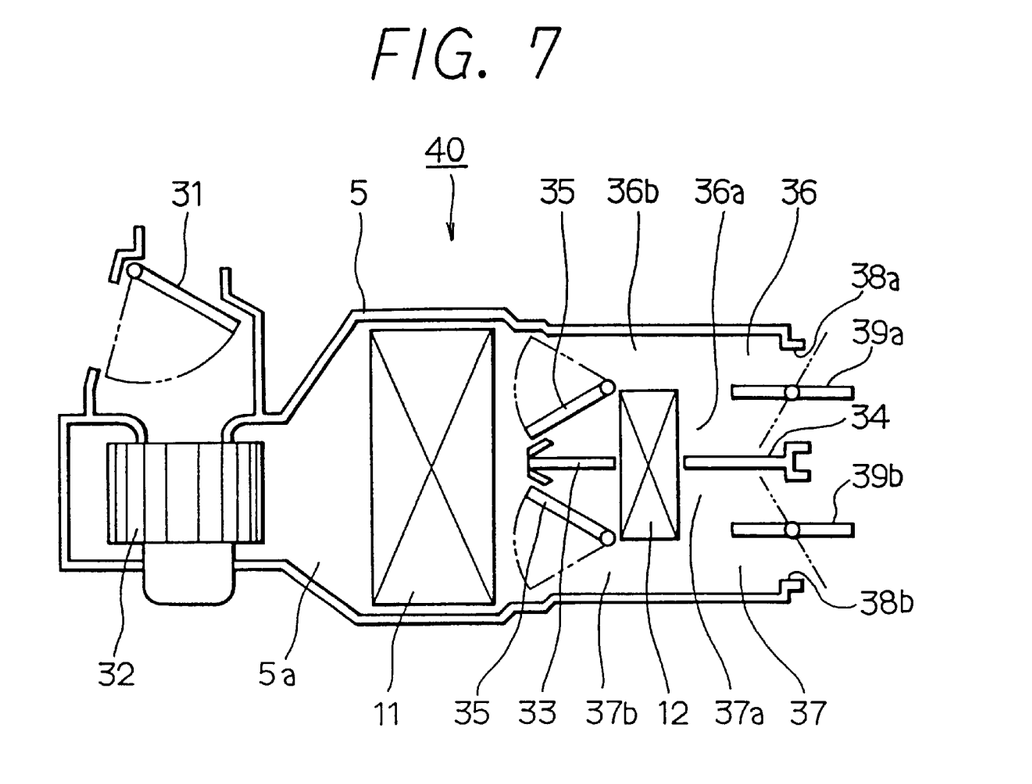
FIG. 7 is a diagram showing an air conditioning apparatus of a fourth embodiment according to the present invention.

In the fourth embodiment, as shown in FIG. 7, an air conditioning apparatus 40 is composed of an inside/outside air switching apparatus 31 for selecting air to be introduced into a case 5 from inside air and outside air, a fan 32 for sucking air, an evaporator 11 for cooling air which is sucked by the fan 32, a heater core 12 for heating air which passed through the evaporator 11 and the like.

The heater core 12 is disposed at the central portion of the case 5 so as to have a predetermined space from wall surfaces of the case 5. The central portion where the heater core 12 is disposed functions as warm air passages 36a and 37a. On the other hand, the spaces between the heater core 12 and the wall surfaces of the case 5 function as cool air passages 36b and 37b. The air which passed through the evaporator 11 flows into the cool air passages 36b and 37b so as to bypass the heater core 12.

Partition plates 33 and 34 are disposed generally on the central line of the case 5 at the upstream air side and the downstream air side of the heater core 12, respectively. The arrangements of the partition plates 33 and 34 with reference to the heater core 12 are the same as in the first embodiment, and therefore the explanation is omitted.

An air passage 5a in the case 5 is partitioned into a driver's seat side air passage 36 as a first air passage, and a passenger seat side passage 37 as a second air passage, by the partition plates 33 and 34. The driver's seat side air passage 36 has the warm air passage 36a and the cool air passage 36b, while the passenger seat side air passage 37 has the warm air passage 37a and the cool air passage 37b.

Further, air mix doors 35 are respectively disposed at the driver's seat side passage 36 and the passenger seat side passage 37 at the most upstream air side of the heater core 12, thereby independently controlling temperatures of the air passing through the driver's seat side passage 36 and the passenger seat side passage 37.

A driver's seat side opening portion 38a is formed at the driver's seat side passage 36 at the downstream air side of the heater core 12. Further, a defroster air outlet for blowing out conditioned air to the passenger compartment, a face air outlet at the driver's seat side and a duct communicating with a foot air outlet are not shown but formed at the downstream air side of the driver's seat side opening portion 38a.

On the other hand, a passenger seat side opening portion 38b is formed at the passenger seat side passage 37 at the downstream air side of the heater core 12. Further, a defroster air outlet for blowing out conditioned air to the passenger compartment, a face air outlet on the passenger seat side and a duct communicating with a foot air outlet (not shown) are formed at the downstream air side of the passenger seat side opening portion 38a, as well as those at the driver's seat side.

An amount of air passing through the driver's seat side opening portion 38a is controlled by a door 39a, while an amount of air passing through the passenger seat side opening portion 38b is controlled by a door 39b.

In the above mentioned air conditioning apparatus 40, the separation characteristics for separating the air having different temperatures from each other, which are independently blown out from the driver's seat side opening portion 38a and the passenger seat side opening portion 38b, can be improved. Consequently, by applying the present invention, it is possible to improve the separation characteristics of the airflows such as inside airflow and outside airflow having not only different humidities from each other but having different temperatures from each other.

The present invention may also be applied to an air conditioning apparatus (not shown) in which air having different temperatures from each other can be blown out from a front seat side air outlet and a rear seat side air outlet.

Figure 8:
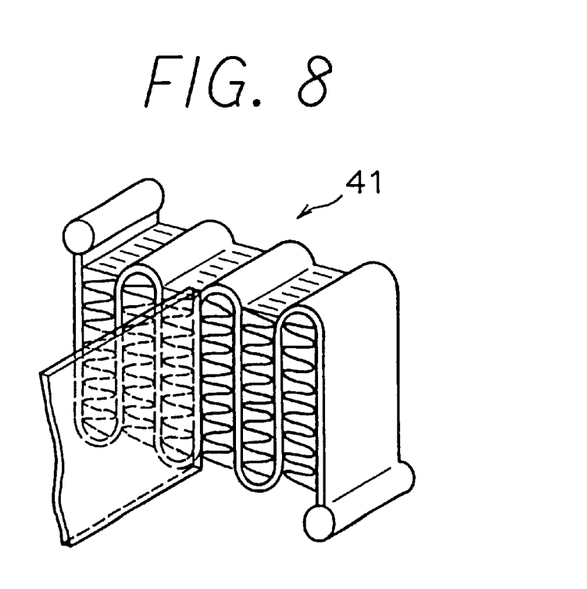
FIG. 8 is a perspective view showing a heat exchanger and an arrangement of the heat exchanger and a partition plate of a modification.

In the foregoing embodiments, the arrangements of the partition plates according to the present invention are applied to the laminated type heat exchangers formed by laminating alternately plural fins and tubes in which a heat exchanging medium flows. However, the heat exchanger is not limited to the above mentioned type, but may be formed by bending a tube as shown in FIG. 8 for example. FIG. 8 shows a serpentine type evaporator 41 composed of a meandering tube and plural fins disposed between a tube wall of the tube. That is, it is acceptable that the heat exchanger only has plural main air passages partitioned by the tube walls.

Although, in the foregoing embodiments, the ends of the partition plates are disposed to be opposite to the ends of the tubes of the heat exchanger, it is acceptable for the partition plate to be parallel to the tubes. Even when one of the ends of the partition plates is disposed to be opposite to an end of the fins on the upstream or downstream air side, generally the same effects as those in the above mentioned embodiments can be obtained.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An air conditioning apparatus comprising:

a case having an air passage therein;

a heat exchanger disposed in said case, said heat exchanger including plural tubes having flat tube walls in parallel with each other so as to form a main air passage, between adjacent flat tube walls and a corrugated fin disposed in said main passage, said heat exchange being performed between air flowing through said main passage and a heat exchanging medium flowing through said plural tubes, said corrugated fin having a plate surface for partitioning said main air passage into plural secondary air passages, said plate surface being formed with a louver for communicating the adjacent secondary air passages with each other, a length of said fin in an airflow direction being generally equal to that of said tubes in said airflow direction; and partitioning means disposed in said case in parallel with said tubes at an upstream air side of said heat exchanger, an end of said partitioning means being adjacent but separate from an end of one of said tubes in the airflow direction, said partitioning means including at least one partition disposed at least up stream of said tubes, said partition separating an air flow upstream of said tubes, said partition being rigidly affixed to said case in said air passage to separate said air passage into a first air passage and a second air passage by a combination of said partitioning means and said one of said tubes, a thickness of said end of said partitioning means being thicker than that of the other portion of said partitioning means.

2. An air conditioning apparatus according to claim 1, wherein,
said partitioning means includes a first partition plate disposed at an upstream air side of said heat exchanger and a second partition plate disposed at a downstream air side of said heat exchanger, and
said first partition plate is opposite to said second partition plate so as to sandwich said heat exchanger therebetween.

3. An air conditioning apparatus according to claim 1, wherein,
a distance between said end of said partitioning means and said end of one said tube in the airflow direction is smaller than 10 mm.

4. An air conditioning apparatus according to claim 2, wherein,
said case is formed with an inside air inlet and an outside air inlet at an upstream air side of said heat exchanger respectively for sucking inside air and outside air; and
said air passage is partitioned by said partitioning means into an inside air passage through which said inside air sucked from said inside air inlet passes, and an outside air passage through which said outside air sucked from said outside air inlet passes.

5. An air conditioning apparatus according to claim 1, wherein said one tube substantially functions as a partition inside said heat exchanger.

6. An air conditioning apparatus according to claim 1, wherein said partitioning means and said of said tubes are oriented in substantially co-planar alignment with one another.

7. An air conditioning apparatus according to claim 1, wherein said heat exchanger is an evaporator and said partitioning means are disposed between a fan and said evaporator and between said evaporator and a heater core.

8. An air conditioning apparatus comprising:
a case having an air passage therein;
an evaporator disposed in said case, for cooling air passing therethrough;
a heater core disposed in said case at a downstream air side of said evaporator, for heating air cooled by said evaporator, said heater core including plural tubes having flat tube walls in parallel with each other so as to form a main air passage between adjacent flat tube walls and a corrugated fin disposed in said main passage, a heat exchange being performed between air flowing through said main passage and a heat exchanging medium flowing through said plural tubes, said corrugated fin having a plate surface for partitioning said main air passage into plural secondary air passages, said plate surface being formed with a louver for communicating the adjacent secondary air passages with each other, a length of said fin in an airflow direction being generally equal to that of said tubes in said air flow direction; and
partitioning means disposed in said case in parallel with said tubes at an upstream air side of said heater core, said partitioning means including at least one partition rigidly affixed to said case and disposed upstream of said tubes, said partition separating an air flow upstream of said tubes, an end of said partition being adjacent but separate from an end of one of said tubes in the airflow direction, said air passage being separated into a first air passage and a second air passage by a combination of said partitioning means and said one tube, each of said first air passage and said second air passage including a warm air passage in which air having passed through said heater core flows and a cool air passage into which air having bypassed said heater core flows, a thickness of said end of said partition being thicker than that of the other portion of said partition; and
door means disposed between said evaporator and said heater core, for adjusting each amount of air flowing into said heater core to be heated in said heater core and air bypassing said heater core.

9. An air conditioning apparatus according to claim 7, wherein said door means includes a first door member and a second door member disposed in said first air passage and said second air passage, respectively.

10. An air conditioning apparatus according to claim 8, wherein said case is formed at a downstream air side of said heater core with a first air outlet portion communicated with said first air passage and a second air outlet portion communicated with a second air passage respectively for sucking inside air and outside air.

11. An air conditioning apparatus according to claim 10, wherein each of said first and second air outlet portions includes plural air outlets.

12. An air conditioning apparatus comprising:
a case having an air passage therein;
a heat exchanger disposed in said case, said heat exchanger including plural tubes having flat tube walls in parallel with each other so as to form a main air passage between adjacent flat tube walls and a corrugated fin disposed in said main passage, a heat exchange being performed between air flowing through said main passage and a heat exchanging medium flowing through said plural tubes, said corrugated fin having a plate surface for partitioning said main air passage into plural secondary air passages, so as to communicate the adjacent secondary air passages with each other; and
partitioning means disposed in said case substantially parallel to said tubes at an upstream air side of said heat exchanger, said partitioning means including at least one partition disposed upstream of said tubes, said partition separating an air flow upstream of said tubes, an end of said partition being adjacent but separate from an end of one of said tubes in the airflow direction, said partition being rigidly affixed to said case to separate said air passage into a first air passage and a second air passage by a combination of said partitioning means and said one tube, a thickness of said end of said partition being thicker than that of the other portion of said partition.

13. An air conditioning apparatus according to claim 12, wherein,
said partitioning means includes a first partition plate disposed at an upstream air side of said heat exchanger and a second partition plate disposed at a downstream air side of said heat exchanger, and
said first partition plate is opposite to said second partition plate so as to sandwich said heat exchanger therebetween.

14. An air conditioning apparatus according to claim 12, further comprising:

another heat exchanger disposed in said case at an upstream air side of said heat exchanger, for cooling air;

wherein said heat exchanger functions to heat air cooled by said another heat exchanger.

15. An air conditioning apparatus according to claim 12, wherein said medium flows in said plural tubes in parallel.

16. An air conditioning apparatus according to claim 12, wherein said plural tubes are formed by bending a single tube such that said medium meanders therein.

17. An air conditioning apparatus according to claim 12, wherein air in said air passage flows into said main passage in a direction substantially perpendicular to said heat exchanger.

18. An air conditioning apparatus comprising:

a case having an air passage therein for directing an air flow through said case;

a heat exchanger disposed in said air passage of said case, said air flow passing through said heat exchanger, said heat exchanger including plural tubes having flat tube walls in parallel with each other so as to form a main air passage, between adjacent flat tube walls and a corrugated fin disposed in said main passage, said heat exchange being performed between air flowing through said main passage and a heat exchanging medium flowing through said plural tubes, said corrugated fin having a plate surface for partitioning said main air passage into plural secondary air passages, said plate surface being formed with a louver for communicating the adjacent secondary air passages with each other, a length of said fin in an airflow direction being generally equal to that of said tubes in said airflow direction; and partitioning means disposed in said air passage of said case in parallel with said tubes at an upstream air side of said heat exchanger, said partitioning means including at least one partition disposed upstream from said tubes, said partition separating an air flow upstream of said tubes, an end of said partition being adjacent but separate from an end of one of said tubes in the airflow direction, said partition being rigidly attached to said case to separate said airflow through said case and said heat exchanger into a first portion and a second portion by a combination of said partitioning means and said one tube, a thickness of said end of said partition is thicker than that of the other portion of said partition.

19. An air conditioning apparatus comprising:

a case having an air passage therein for directing air flow through said case;

an evaporator disposed in said air passage of said case, for cooling air passing therethrough, said air flow passing through said evaporator for heating air cooled by said evaporator, said air flow passing through said heater core, said heater core including plural tubes having flat tube walls in parallel with each other so as to form a main air passage between adjacent flat tube walls and a corrugated fin disposed in said main passage, a heat exchange being performed between air flowing through said main passage and a heat exchanging medium flowing through said plural tubes, said corrugated fin having a plate surface for partitioning said main air passage into plural secondary air passages, said plate surface being formed with a louver for communicating the adjacent secondary air passages with each other, a length of said fin in an airflow direction being generally equal to that of said tubes in said airflow direction;

partitioning means disposed in said air passage of said case in parallel with said tubes, said partitioning means including at least one partition rigidly affixed upstream of said tubes, said partition separating an air flow upstream of said tubes, an end of said partition being adjacent but separate from an end of one of said tubes in the airflow direction, said airflow through said evaporator and said heater core being separated into a first portion and a second portion by a combination of said partitioning means and said one tube, each of said first portion and said second portion including a warm air portion in which air having passed through said heater core flows and a cool air portion in which air having bypassed said heater core flows, a thickness of said end of said partition being thicker than that of the other portion of said partition; and door means disposed between said evaporator and said heater core, for adjusting each amount of air flowing into said heater core to be heated in said heater core and air bypassing said heater core.

20. An air conditioning apparatus comprising:

a case having an air passage therein for directing an air flow through said case;

a heat exchanger disposed in said air passage of said case, said air flow passing through said case and said heat exchanger, said heat exchanger including plural tubes having flat tube walls in parallel with each other so as to form a main air passage between adjacent flat tube walls and a corrugated fin disposed in said main passage, a heat exchange being performed between air flowing through said main passage and a heat exchanging medium flowing through said plural tubes, said corrugated fin having a plate surface for partitioning said main air passage into plural secondary air passages, so as to communicate adjacent secondary air passages with each other; and partitioning means disposed in said air passage of said case substantially parallel to said tubes at an upstream air side of said heat exchanger, said partitioning means including at least one partition rigidly affixed upstream of said tubes, said partition separating an air flow upstream of said tubes, an end of said partition being adjacent but separate from an end of one of said tubes in the airflow direction, said air flow through said heat exchanger being separated into a first portion and a second portion by a combination of said partitioning means and said one tube, a thickness of said end of said partition being thicker than that of the other portion of said partition.

21. An air conditioning apparatus comprising:

a case having an air passage therein;

an evaporator disposed in said case, for cooling air passing therethrough;

a heater core disposed in said case at a downstream air side of said evaporator, for heating air cooled by said evaporator, said heater core including plural tubes having flat tube walls in parallel with each other so as to form a main air passage between adjacent flat tube walls and a corrugated fin disposed in said main passage, a heat exchange being performed between air flowing through said main passage and a heat exchanging medium flowing through said plural tubes, said corrugated fin having a plate surface for partitioning said main air passage into plural secondary air passages, said plate surface being formed with a louver for communicating adjacent secondary air passages with each other, a length of said fin in an airflow direction being generally equal to that of said tubes in said airflow direction;

partitioning means disposed in said case in parallel with said tubes at an upstream air side of said heater core, said partitioning means including at least one partition rigidly affixed upstream of said tubes, said partition separating an air flow upstream of said tubes, an end of said partition being adjacent but separate from an end of one of said tubes in the airflow direction, said air passage being separated into a first air passage and a second air passage, by a combination of said partitioning means and said one tube, each of said first air passage and said second air passage including a warm air passage in which air having passed through said heater core flows and a cool air passage into which air having bypassed said heater core flows, a thickness of said end of said partition being thicker than that of the other portion of said partition; and door means disposed between said evaporator and said heater core, for adjusting each amount of air flowing into said heater core to be heated in said heater core and air bypassing said heater core; wherein, said evaporator includes plural tubes having flat tube walls in parallel with each other so as to form a main air passage between the adjacent flat tube walls and a corrugated fin disposed in said main passage, a heat exchange being performed between air flowing through said main passage and a heat exchanging medium flowing through said plural tubes, said corrugated fin having a plate surface for partitioning said main air passage into plural secondary air passages, said plate surface being formed with a louver for communicating the adjacent secondary air passages with each other.

22. An air conditioning apparatus according to claim 21, wherein said door means includes a first door member and a second door member disposed in said first air passage and said second air passage, respectively.

23. An air conditioning apparatus according to claim 21, wherein said case is formed at a downstream air side of said heater core with a first air outlet portion communicated with said first air passage and a second air outlet portion communicated with a second air passage respectively for sucking inside air and outside air.

24. An air conditioning apparatus comprising:

a case having an air passage therein;

a heat exchanger disposed in said case, said heat exchanger including plural tubes having flat tube walls in parallel with each other so as to form a main air passage, between adjacent flat tube walls and a corrugated fin disposed in said main passage, said heat exchange being performed between air flowing through said main passage and a heat exchanging medium flowing through said plural tubes, said corrugated fin having a plate surface for partitioning said main air passage into plural secondary air passages, said plate surface being formed with a louver for communicating the adjacent secondary air passages with each other, a length of said fin in an airflow direction being generally equal to that of said plural tubes in said airflow direction;

partitioning means disposed in said case in parallel with said tubes, an end of said partitioning means being adjacent to an end of one of said tubes in the airflow direction, said air passage being separated into a first air passage and a second air passage by a combination of said partitioning means and said one tube; wherein said partitioning means is disposed at an upstream air side of said heat exchanger, a thickness of said end of said partitioning means is thicker than that of the other portion of said partitioning means.

* * * * *